United States Patent
Iwata et al.

(10) Patent No.: US 9,982,118 B2
(45) Date of Patent: May 29, 2018

(54) FLAME RETARDANT RESIN COMPOSITION AND CABLE USING SAME

(71) Applicant: FUJIKURA LTD., Koto-ku, Tokyo (JP)

(72) Inventors: Masayuki Iwata, Chiba (JP); Tomohisa Watanabe, Chiba (JP); Kazuya Hoshino, Mie (JP)

(73) Assignee: FUJIKURA LTD., Koto-ku, Tokyo (JP)

( * ) Notice: Subject to any disclaimer, the term of this patent is extended or adjusted under 35 U.S.C. 154(b) by 492 days.

(21) Appl. No.: 14/261,731

(22) Filed: Apr. 25, 2014

(65) Prior Publication Data

US 2014/0234621 A1    Aug. 21, 2014

Related U.S. Application Data

(63) Continuation of application No. PCT/JP2012/077695, filed on Oct. 26, 2012.

(30) Foreign Application Priority Data

Oct. 28, 2011 (JP) .................................. 2011-236981
Jun. 25, 2012 (JP) .................................. 2012-142502
(Continued)

(51) Int. Cl.
*D02G 3/00* (2006.01)
*C08L 23/02* (2006.01)
(Continued)

(52) U.S. Cl.
CPC ................ *C08L 23/02* (2013.01); *C08K 3/26* (2013.01); *C08K 5/098* (2013.01); *C08L 23/06* (2013.01);
(Continued)

(58) Field of Classification Search
CPC .......... C08L 23/06; C08L 83/04; C08L 23/02; C08L 23/12; C08K 3/26; C08K 5/098;
(Continued)

(56) References Cited

U.S. PATENT DOCUMENTS 5,057,367 A * 10/1991 Morii .................. C08K 3/22
   174/110 SR
6,204,318 B1 * 3/2001 Hayami .................. C08K 3/22
   428/364
(Continued)

FOREIGN PATENT DOCUMENTS

CN   1152471   6/1997
CN   1508190   6/2004
(Continued)

OTHER PUBLICATIONS

Chinese Office Action dated Apr. 1, 2015 in Chinese Patent Application No. 201280040964.8.
(Continued)

*Primary Examiner* — Holly Rickman
*Assistant Examiner* — Linda Chau
(74) *Attorney, Agent, or Firm* — Sughrue Mion, PLLC

(57) ABSTRACT

Provided is a flame retardant resin composition including a base resin, calcium carbonate particles that are incorporated at a proportion of 10 parts by mass or more relative to 100 parts by mass of the base resin, a silicone-based compound that is incorporated at a proportion of more than 1 part by mass relative to 100 parts by mass of the base resin, and a fatty acid-containing compound that is incorporated at a proportion of more than 3 parts by mass relative to 100 parts by mass of the base resin. The average particle size of the calcium carbonate particles is 0.7 μm or larger.

14 Claims, 2 Drawing Sheets

(30) Foreign Application Priority Data

Jun. 25, 2012 (JP) .................................. 2012-142503
Sep. 21, 2012 (JP) .................................. 2012-208007

(51) Int. Cl.
    *C08K 3/26*     (2006.01)
    *C08L 83/04*     (2006.01)
    *H01B 3/44*     (2006.01)
    *H01B 7/295*     (2006.01)
    *C08K 5/098*     (2006.01)
    *C08L 23/06*     (2006.01)
    *C08L 23/12*     (2006.01)
    *H01B 3/28*     (2006.01)
    *H01B 3/46*     (2006.01)

(52) U.S. Cl.
    CPC ............... *C08L 23/12* (2013.01); *C08L 83/04* (2013.01); *H01B 3/44* (2013.01); *H01B 7/295* (2013.01); *H01B 3/28* (2013.01); *H01B 3/46* (2013.01); *Y10T 428/2962* (2015.01)

(58) Field of Classification Search
    CPC ... H01B 3/28; H01B 3/44; H01B 3/46; H01B 7/295; Y10T 428/2962
    See application file for complete search history.

(56) References Cited

U.S. PATENT DOCUMENTS

| | | | |
|---|---|---|---|
| 7,737,364 B2 | 6/2010 | Park et al. | |
| 2007/0149650 A1 | 6/2007 | Masuda | |
| 2008/0182923 A1* | 7/2008 | Park | C08F 255/00 523/173 |
| 2008/0194749 A1* | 8/2008 | Huhtala | C08L 83/04 524/401 |
| 2010/0101822 A1 | 4/2010 | Bunker et al. | |

FOREIGN PATENT DOCUMENTS

| | | |
|---|---|---|
| CN | 101155867 | 4/2008 |
| CN | 101213618 | 7/2008 |
| CN | 101679672 | 3/2010 |
| CN | 101981109 | 2/2011 |
| EP | 0 774 487 A1 | 5/1997 |
| EP | 0 774 488 A1 | 5/1997 |
| EP | 1 512 718 | 3/2005 |
| EP | 1 695 997 | 8/2006 |
| EP | 1 866 365 | 9/2009 |
| JP | 03-028271 A | 2/1991 |
| JP | 09-169918 A | 6/1997 |
| JP | 2009-169918 | 6/1997 |
| JP | 2002-105411 A | 4/2002 |
| JP | 2005-179577 A | 7/2005 |
| JP | 2005-350505 A | 12/2005 |
| JP | 2010-520937 A | 6/2010 |
| WO | 2008/112393 A1 | 9/2008 |
| WO | 2009/119942 | 10/2009 |

OTHER PUBLICATIONS

Extended European Search Report dated May 19, 2015 in European Patent Application 12843190.5.
Tansan Calcium ni Tsuite, Shiraishi Calcium Kaisha, Ltd. no HP (http://www.shiraishi.co.jp/calcium/carbonate/), pp. 1-2.
International Search Report of PCT/JP2012/077695 dated Dec. 4, 2012.
Communication dated Nov. 28, 2016 from the State Intellectual Property Office of the P.R.C. in counterpart application No. 201510501637.3.
Communication dated Nov. 9, 2016 from the State Intellectual Property Office of the P.R.C. in counterpart Application No. 201510501595.3.

* cited by examiner

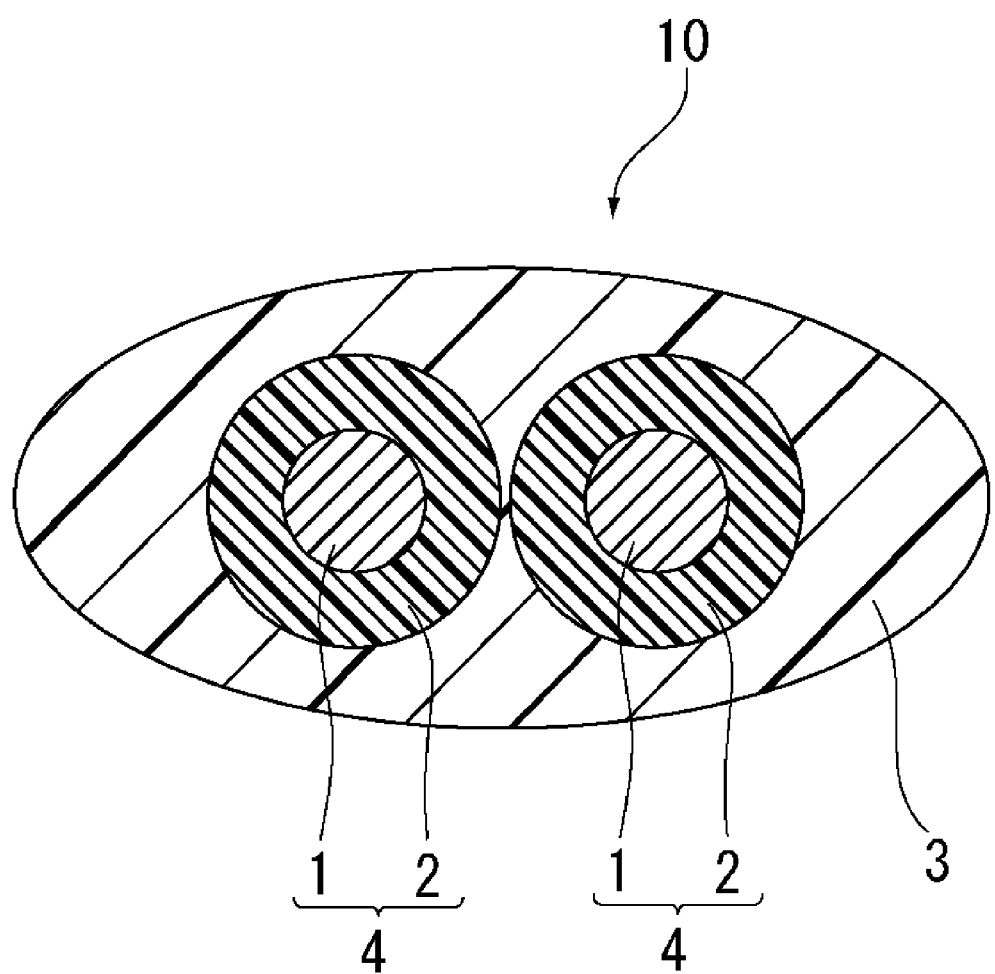

FLAME RETARDANT RESIN COMPOSITION AND CABLE USING SAME

CROSS REFERENCE TO RELATED APPLICATIONS

This application is a Continuation of National Stage of International Application No. PCT/JP2012/077695 filed Oct. 26, 2012, claiming priority based on Japanese Patent Applications No. 2011-236981 filed Oct. 28, 2011, No. 2012-142502 filed Jun. 25, 2012, No. 2012-142503 filed Jun. 25, 2012 and No. 2012-208007 filed Sep. 21, 2012, the contents of all of which are incorporated herein by reference in their entirety.

TECHNICAL FIELD

The present invention relates to a flame retardant resin composition and a cable using the same.

BACKGROUND ART

In the coating of insulated wires, cable sheaths, tubes, tapes, packaging materials, construction materials and the like, so-called eco-materials are widely used.

As such eco-materials, there is known, for example, a composition formed by adding calcium carbonate as a flame retardant to a polyolefin resin, and also adding a silicone-based compound such as silicone oil, or magnesium stearate as a flame retardant aid (see Patent Document 1 described below).

CITATION LIST

Patent Document

Patent Document 1: Japanese Patent Application Laid-Open (JP-A) No. H09-169918

SUMMARY OF INVENTION

Problem to be Solved by the Invention

However, it is difficult to say that flame retardancy has been sufficiently secured with the composition described in the Patent Document 1. Here, when the amount of the flame retardant added is increased, flame retardancy can be enhanced; however, in this case, the mechanical characteristics of the composition are deteriorated.

Therefore, there has been a demand for a flame retardant resin composition that can secure excellent flame retardancy while securing excellent mechanical characteristics.

The present invention was achieved under such circumstances, and it is an object of the invention to provide a flame retardant resin composition which can secure excellent flame retardancy while securing excellent mechanical characteristics, and a cable using this resin composition.

Means for Solving Problem

In order to solve the problems described above, the inventors of the present invention paid attention particularly to calcium carbonate, which is a flame retardant, and conducted an investigation. As a result, the inventors found that the problems can be solved when the average particle size of calcium carbonate is adjusted to a value larger than or equal to a certain value, and calcium carbonate particles, a silicone-based compound, and a fatty acid-containing compound are respectively incorporated at particular proportions relative to a base resin.

That is, the present invention is a flame retardant resin composition containing a base resin; calcium carbonate particles that are incorporated at a proportion of 10 parts by mass or more relative to 100 parts by mass of the base resin; a silicone-based compound that is incorporated at a proportion more than 1 part by mass relative to 100 parts by mass of the base resin; and a fatty acid-containing compound that is incorporated at a proportion more than 3 parts by mass relative to 100 parts by mass of the base resin, the average particle size of the calcium carbonate particles being 0.7 μm or larger.

According to the flame retardant resin composition of the present invention, excellent flame retardancy can be secured while securing excellent mechanical characteristics.

Meanwhile, the inventors of the present invention have the following point of view for the reason why superior flame retardancy can be obtained from the flame retardant resin composition of the present invention.

That is, when calcium carbonate particles, a silicone-based compound, and a fatty acid-containing compound are used, a surface barrier layer is formed at the time of combustion. At this time, if the surface barrier layer is compact, and also, such a compact surface barrier layer is formed rapidly, it is considered that a flame retardant effect will be enhanced. In order for a compact surface barrier layer to be formed rapidly, the gaps between the particles of the calcium carbonate that constitutes the surface barrier layer, or the particles of a decomposition product thereof, need to be filled up as rapidly as possible. From that point of view, since the average particle size of the calcium carbonate particles is as large as 0.7 μm or more as in the case of the present invention, and the specific surface area thereof is decreased, the gaps between the calcium carbonate particles can be rapidly filled up. It is thus contemplated that as a result, the rate of forming a compact surface barrier layer may be increased, and the flame retardant effect may be enhanced.

In the flame retardant resin composition, it is preferable that the calcium carbonate particles described above be incorporated at a proportion of from 10 parts by mass to 300 parts by mass relative to 100 parts by mass of the base resin, the silicone-based compound be incorporated at a proportion of more than 1 part by mass and less than or equal to 20 parts by mass relative to 100 parts by mass of the base resin, the fatty acid-containing compound be incorporated at a proportion of more than 3 parts by mass and less than or equal to 40 parts by mass relative to 100 parts by mass of the base resin, and the average particle size of the calcium carbonate particles be from 0.7 μm to 30 μm.

In the flame retardant resin composition, it is preferable that the average particle size of the calcium carbonate particles be from 0.7 μm to 15 μm.

In regard to the flame retardant resin composition, it is preferable that the average particle size of the calcium carbonate particles be 1.2 μm or larger.

In this case, more excellent flame retardancy is obtained as compared with the case in which the average particle size of calcium carbonate particles is less than 1.2 μm.

In the flame retardant resin composition, it is preferable that the average particle size of the calcium carbonate particles be from 1.2 μm to 3.6 μm.

In this case, more excellent surface smoothness can be imparted to the flame retardant resin composition, and the surface of the flame retardant resin composition can be made less susceptible to damage, as compared with the case in which the average particle size of the calcium carbonate particles is more than 3.6 µm. Also, more excellent flame retardancy can be imparted to the flame retardant resin composition, as compared with the case in which the average particle size of the calcium carbonate particles is less than 1.2 µm.

In the flame retardant resin composition, it is preferable that the average particle size of the calcium carbonate particles be from 1.2 µm to 1.8 µm.

In this case, more excellent surface smoothness can be imparted to the flame retardant resin composition, and the surface of the flame retardant resin composition can be made less susceptible to damage, as compared with the case in which the average particle size of the calcium carbonate particles is larger than 1.8 µm. When the average particle size of the calcium carbonate particles is in the range described above, more excellent flame retardancy can be imparted to the flame retardant resin composition, as compared with the case in which the average particle size of the calcium carbonate particles is less than 1.2 µm.

In the flame retardant resin composition, it is preferable that the average particle size of the calcium carbonate particles be larger than 1.8 µm and less than or equal to 3.6 µm.

In this case, more excellent flame retardancy can be secured as compared with the case in which the average particle size of the calcium carbonate particles is 1.8 µm or less. Furthermore, when the average particle size of the calcium carbonate particles is within the range described above, more excellent surface smoothness can be imparted to the flame retardant resin composition, and the surface of the flame retardant resin composition can be made less susceptible to damage, as compared with the case in which the average particle size of the calcium carbonate particles is larger than 3.6 µm.

In the flame retardant resin composition, it is preferable that the calcium carbonate particles be incorporated at a proportion of from 10 parts by mass to 120 parts by mass relative to 100 parts by mass of the base resin, the silicone-based compound be incorporated at a proportion of more than 1 part by mass and less than or equal to 10 parts by mass relative to 100 parts by mass of the base resin, and the fatty acid-containing compound be incorporated at a proportion of more than 3 parts by mass and less than or equal to 20 parts by mass relative to 100 parts by mass of the base resin.

In this case, more excellent flame retardancy is obtained or blooming does not occur more easily as compared with the case in which the amounts of incorporation of the silicone-based compound and the fatty acid-containing compound are out of the ranges described above.

In the flame retardant resin composition, it is preferable that the silicone-based compound be incorporated at a proportion of more than 3 parts by mass and less than or equal to 10 parts by mass relative to 100 parts by mass of the base resin.

In this case, even if the amount of incorporation of the calcium carbonate particles is smaller, since the calcium carbonate particles can exhibit the flame retardant effect effectively, more excellent surface smoothness can be secured while securing more excellent flame retardancy.

In the flame retardant resin composition, it is preferable that the average particle size of the calcium carbonate particles be larger than 1.8 µm and less than or equal to 5.0 µm, and the silicone-based compound be incorporated at a proportion of more than 1 part by mass and less than or equal to 3 parts by mass relative to 100 parts by mass of the base resin.

In this case, more excellent flame retardancy is obtained as compared with the case in which the proportion of the silicone-based compound is 1 part by mass or less. Furthermore, in this case, more excellent terminal workability is obtained as compared with the case in which the silicone-based compound is included at a proportion of more than 3 parts by mass relative to 100 parts by mass of the base resin, or the case in which the average particle size of the calcium carbonate particles is out of the above-described range. That is, when an insulating layer is stripped off using a stripper, the insulating layer is not easily stretched, and an internal conductor or the insulating layer becomes less susceptible to damage as compared with the case in which the average particle size is larger than 5.0 µm.

The inventors of the present invention surmise as follows for the reason why more excellent terminal workability is obtained in the flame retardant resin composition described above.

That is, it is contemplated that terminal workability depends on the elongation of the base resin. As the base resin undergoes less elongation, it becomes easier to perform a terminal treatment, that is, to mechanically remove the flame retardant resin composition. Then, the extent of elongation of the base resin is decreased as the average particle size of the calcium carbonate particles is larger, and as the amount of incorporation of the silicone-based compound is smaller. Therefore, the inventions speculate that more excellent terminal workability would be obtained by adjusting the average particle size of the calcium carbonate particles to be larger than 1.8 µm and less than or equal to 5.0 µm, and adjusting the amount of incorporation of the silicone-based compound to be more than 1 part by mass and less than or equal to 3 parts by mass.

In the flame retardant resin composition, it is preferable that the average particle size of the calcium carbonate particles be larger than or equal to 0.7 µm and less than 1.2 µm; the calcium carbonate particles be incorporated at a proportion of from 10 parts by mass to 120 parts by mass relative to 100 parts by mass of the base resin; the silicone-based compound be incorporated at a proportion of more than 1 part by mass and less than or equal to 3 parts by mass relative to 100 parts by mass of the base resin; and the fatty acid-containing compound be incorporated at a proportion of more than 3 parts by mass and less than or equal to 20 parts by mass relative to 100 parts by mass of the base resin.

In this case, in addition to the possibility that excellent mechanical characteristics may be secured, and excellent flame retardancy may be secured, excellent low temperature resistance can also be secured.

The inventors surmise as follows for the reason why excellent low temperature resistance is obtained in the flame retardant resin composition described above.

That is, it is speculated that when the average particle size of the calcium carbonate particles is adjusted to be less than 1.2 µm, stress concentration on the interface between the calcium carbonate particles and the base resin is relieved, and therefore, low temperature resistance may be enhanced.

In the flame retardant resin composition, it is preferable that the ratio of the amount of incorporation of the fatty acid-containing compound with respect to the amount of incorporation of the silicone-based compound be more than 2 and less than or equal to 5.

In this case, more excellent flame retardancy can be secured.

In the flame retardant resin composition, it is preferable that the calcium carbonate particles be heavy calcium carbonate, for the reason of being easily available and low-priced.

In the flame retardant resin composition, it is preferable that the base resin be a polyolefin compound.

Furthermore, the present invention is a cable which includes an insulated wire having a conductor and an insulating layer coating the conductor, the insulating layer being the flame retardant resin composition described above.

Furthermore, the present invention is a cable which includes an insulated wire having a conductor and an insulating layer coating the conductor and a sheath covering the insulating layer, at least one of the insulating layer and the sheath being formed of the flame retardant resin composition described above.

Meanwhile, in the present invention, the term "average particle size" refers to the average value of R, which is obtained by, when plural calcium carbonate particles are observed by SEM, determining the two-dimensional image area S of each particle, and calculating R of each particle according to the following formula:

$$R = 2 \times (S/\pi)^{1/2}$$

wherein S is considered as being equal to the area of a circle.

Effect of the Invention

According to the present invention, a flame retardant resin composition which can secure excellent flame retardancy while securing excellent mechanical characteristics, and a cable using this resin composition are provided.

BRIEF DESCRIPTION OF DRAWINGS

FIG. 2 is a cross-section view cut along the II-II line illustrated in FIG. 1.

MODE(S) FOR CARRYING OUT THE INVENTION

Figure 1:
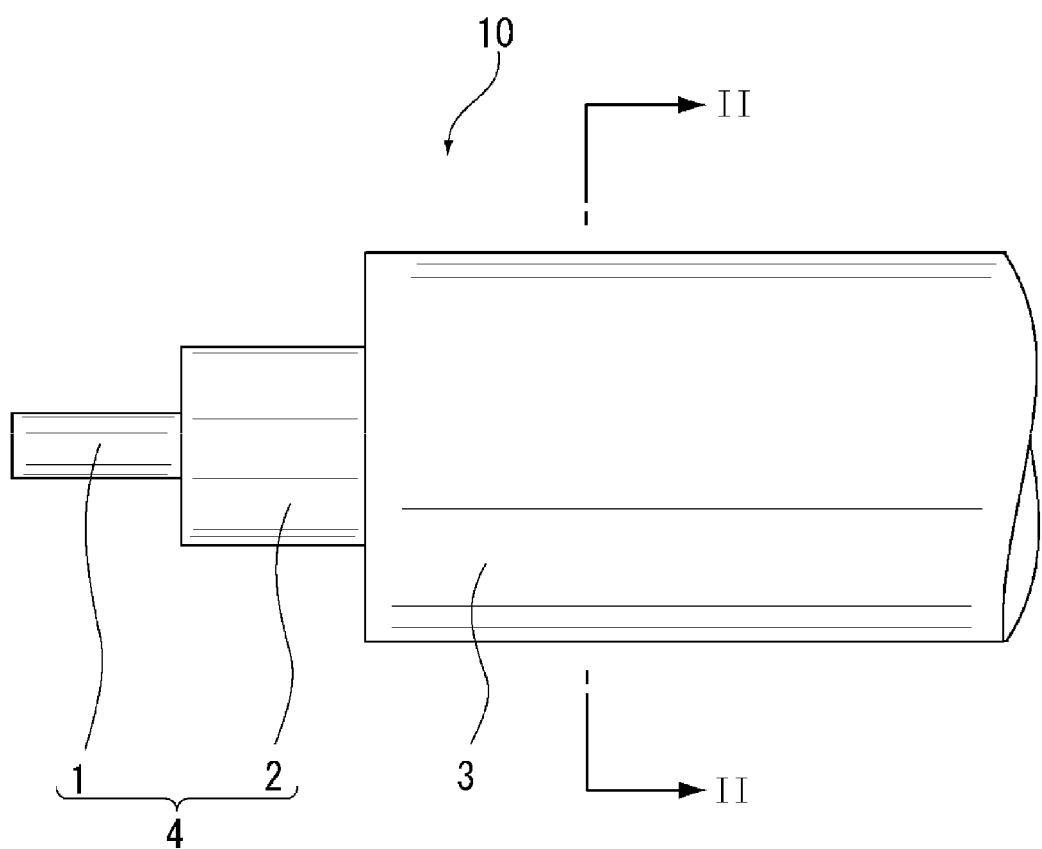
FIG. 1 is a partial side view illustrating an embodiment of the cable of the present invention.

Hereinafter, embodiments of the present invention will be described in detail using FIG. 1 and FIG. 2.

[Cable]

FIG. 1 is a partial side view illustrating an embodiment of the cable according to the present invention, and illustrates a flat cable. FIG. 2 is a cross-sectional view cut along the II-II line illustrated in FIG. 1. As illustrated in FIG. 1 and FIG. 2, the flat cable 10 includes two insulated wires 4, and a sheath 3 that coats the two insulated wires 4. The insulated wire 4 has an internal conductor 1, and an insulating layer 2 that coats the internal conductor 1.

Here, the insulating layer 2 is formed of a flame retardant resin composition, and this flame retardant resin composition includes a base resin; calcium carbonate particles that are incorporated at a proportion of 10 parts by mass or more relative to 100 parts by mass of the base resin; a silicone-based compound that is incorporated at a proportion of more than 1 part by mass relative to 100 parts by mass of the base resin; and a fatty acid-containing compound that is incorporated at a proportion of more than 3 parts by mass relative to 100 parts by mass of the base resin. Here, the average particle size of the calcium carbonate particles is 0.7 μm or larger.

According to the flame retardant resin composition, excellent flame retardancy can be secured while securing excellent mechanical characteristics. Therefore, the flat cable 10 can also secure excellent flame retardancy while securing excellent mechanical characteristics.

[Method for Producing Cable]

Next, a method for producing the flat cable 10 will be explained.

(Internal Conductor)

First, an internal conductor 1 is prepared. The internal conductor 1 may be composed of a single strand, or may be composed of plural strands bundled together. Furthermore, the internal conductor 1 is not particularly limited in terms of the diameter of the conductor, the material of the conductor and the like, and can be appropriately selected in accordance with the use.

(Flame Retardant Resin Composition)

On the other hand, the flame retardant resin composition is prepared. As described above, the flame retardant resin composition includes a base resin; calcium carbonate particles that are incorporated at a proportion of 10 parts by mass or more relative to 100 parts by mass of the base resin; a silicone-based compound that is incorporated at a proportion of more than 1 part by mass relative to 100 parts by mass of the base resin; and a fatty acid-containing compound that is included at a proportion of more than 3 parts by mass relative to 100 parts by mass of the base resin.

(Base Resin)

The base resin is not particularly limited as long as it is a resin, but examples of such a resin include a polyolefin compound such as polyethylene or polypropylene; an ethylene-ethyl acrylate copolymer (EEA), an ethylene-methyl acrylate copolymer (EMA), and a styrene-butylene rubber (SBR). These can be used singly or as mixtures of two or more kinds.

(Calcium Carbon Particles)

The calcium carbonate particles may be any of heavy calcium carbonate or light calcium carbonate. Among them, from the viewpoint of being easily available and low-priced, heavy calcium carbonate is preferred.

The average particle size of the calcium carbonate particles is 0.7 μm or larger. If the average particle size of the calcium carbonate particles is less than 0.7 μm, flame retardancy is markedly decreased. The average particle size of the calcium carbonate particles is preferably 30 μm or less, and more preferably 15 μm or less.

The average particle size of the calcium carbonate particles is preferably 1.2 μm or larger. In this case, more excellent flame retardancy is obtained as compared with the case in which the average particle size of the calcium carbonate particles is less than 1.2 μm.

However, the average particle size of the calcium carbonate particles is preferably 3.6 μm or less. In this case, more excellent surface smoothness can be imparted to the flame retardant resin composition, and the surface of the flame retardant resin composition can be made less susceptible to damage, as compared with the case in which the average particle size of the calcium carbonate particles is larger than 3.6 μm.

The average particle size of the calcium carbonate particles is more preferably 1.8 μm or less. In this case, more excellent surface smoothness can be imparted to the flame retardant resin composition, and the surface of the flame retardant resin composition can be made less susceptible to damage, as compared with the case in which the average particle size of the calcium carbonate particles is larger than 1.8 μm. However, from the viewpoint of securing more excellent flame retardancy, the average particle size of the calcium carbonate particles is preferably larger than 1.8 µm.

The average particle size of the calcium carbonate particles may also be larger than or equal to 0.7 µm and less than 1.2 µm. In this case, in addition to the possibility that excellent mechanical characteristics may be secured, and excellent flame retardancy may be secured, excellent low temperature resistance can also be secured.

The calcium carbonate particles may be incorporated at a proportion of 10 parts by mass or more relative to 100 parts by mass of the base resin. If the calcium carbonate particles are incorporated at a proportion of less than 10 parts by mass relative to 100 parts by mass of the base resin, flame retardancy is markedly deteriorated.

It is preferable that the calcium carbonate particles be included at a proportion of 300 parts by mass or less relative to 100 parts by mass of the base resin. When the proportion of the calcium carbonate particles is 300 parts by mass or less, the mechanical characteristics of the flame retardant resin composition can be further enhanced while sufficiently securing flame retardancy of the resin composition, as compared with the case in which the proportion is more than 300 parts by mass.

Furthermore, the calcium carbonate particles are preferably included at a proportion of 150 parts by mass or less, even more preferably included at a proportion of 120 parts by mass or less, still more preferably included at a proportion of 80 parts by mass or less, and particularly preferably included at a proportion of 50 parts by mass or less. When the calcium carbonate particles are incorporated at a proportion in the ranges described above, the mechanical characteristics can be more sufficiently enhanced while sufficiently securing the flame retardant resin composition, as compared with the case in which the proportion exceeds the upper limits of the various aforementioned ranges.

(Silicone-Based Compound)

The silicone-based compound is a compound which functions as a flame retardant aid. Examples of the silicone-based compound include polyorganosiloxanes. Here, the polyorganosiloxanes are compounds which have siloxane bonds in the main chain, and have organic groups in side chains. Examples of the organic groups include a methyl group, a vinyl group, an ethyl group, a propyl group, and a phenyl group. Specific examples of the polyorganosiloxanes include dimethylpolysiloxane, methylethylpolysiloxane, methyloctylpolysiloxane, methylvinylpolysiloxane, methylphenylpolysiloxane, and methyl-(3,3,3-trifluoropropyl) polysiloxane. Examples of the polyorganosiloxanes include silicone powders, silicone gums, and silicone resins. Among them, silicone gums are preferred. In this case, blooming does not easily occur.

As described above, it is desirable that the silicone-based compound be incorporated at a proportion of more than 1 part by mass relative to 100 parts by mass of the base resin. When the silicone-based compound is included at a proportion of 1 part by mass or less, flame retardancy is deteriorated.

It is preferable that the silicone-based compound be included at a proportion of more than 3 parts by mass relative to 100 parts by mass of the base resin. In this case, more excellent flame retardancy is obtained as compared with the case in which the proportion of the silicone-based compound is 3 parts by mass or less.

Furthermore, it is preferable that the silicone-based compound be included at a proportion of 20 parts by mass or less relative to 100 parts by mass of the base resin. When the silicone-based compound is included at a proportion of 20 parts by mass or less, blooming does not easily occur as compared with the case in which the silicone-based compound is included at a proportion of more than 20 parts by mass. It is more preferable that the silicone-based compound be included at a proportion of 10 parts by mass or less relative to 100 parts by mass of the base resin.

However, when the average particle size of the calcium carbonate particles is larger than 1.8 µm and less than or equal to 5.0 µm, from the viewpoint of further enhancing the terminal workability of the insulating layer 2 and the sheath 3, the silicone-based compound is preferably incorporated at a proportion of more than 1 part by mass and less than or equal to 3 parts by mass relative to 100 parts by mass of the base resin.

The silicone-based compound may be attached in advance to the surface of the calcium carbonate particles. In this case, it is preferable that the entirety of each of the calcium carbonate particles included in the flame retardant resin composition be coated with the silicone-based compound. In this case, since the calcium carbonate particles can be easily dispersed in the base resin, uniformity of the characteristics of the flame retardant resin composition is further enhanced.

Regarding the method of attaching the silicone-based compound to the surface of calcium carbonate, for example, silicone-based compound-attached calcium carbonate particles can be obtained by adding the silicone-based compound to the calcium carbonate particles, mixing the components to obtain a mixture, subsequently drying this mixture at 40° C. to 75° C. for 10 minutes to 40 minutes, and pulverizing the dried mixture using a Henschel mixer, an atomizer or the like.

(Compound Containing Fatty Acid)

The fatty acid-containing compound is a compound which functions as a flame retardant aid. The fatty acid-containing compound refers to a compound containing a fatty acid or a metal salt thereof. Here, as the fatty acid, a fatty acid having 12 to 28 carbon atoms is used. Examples of such a fatty acid include lauric acid, myristic acid, palmitic acid, stearic acid, tuberculostearic acid, oleic acid, linoleic acid, arachidonic acid, behenic acid, and montanic acid. Among them, the fatty acid is preferably stearic acid or tuberculostearic acid. Stearic acid is particularly preferred. In this case, superior flame retardancy is obtained as compared with the case in which a fatty acid other than stearic acid or tuberculostearic acid is used.

Examples of the metal that constitutes a metal salt of the fatty acid include magnesium, calcium, zinc and lead. The metal salt of the fatty acid is preferably magnesium stearate. In this case, far superior flame retardancy is obtained as compared with the case in which a fatty acid metal salt other than magnesium stearate is used.

It is desirable that the fatty acid-containing compound be incorporated at a proportion of more than 3 parts by mass relative to 100 parts by mass of the base resin, as described above. When the fatty acid-containing compound is included at a proportion of 3 parts by mass or less, flame retardancy is deteriorated. It is more preferable that the fatty acid-containing compound be included at a proportion of 5 parts by mass or more relative to 100 parts by mass of the base resin.

Furthermore, it is preferable that the fatty acid-containing compound be included at a proportion of 40 parts by mass or less relative to 100 parts by mass of the base resin. When the proportion of the fatty acid-containing component is in the range described above, more excellent flame retardancy is obtained, or blooming does not easily occur, as compared with the case in which the proportion is out of the aforementioned range. The fatty acid-containing compound is more preferably included at a proportion of 20 parts by mass or less relative to 100 parts by mass of the base resin.

It is preferable that the ratio of the amount of incorporation of the fatty acid-containing compound with respect to the amount of incorporation of the silicone-based compound be larger than 2 and less than or equal to 5. More excellent flame retardancy can be secured as compared with the case in which the ratio of the amount of incorporation of the fatty acid-containing compound with respect to the amount of incorporation of the silicone-based compound is out of the range described above.

The flame retardant resin composition may optionally further include an oxidation inhibitor, an ultraviolet-induced deterioration inhibitor, a processing aid, a coloring pigment, a lubricating agent, and a filler such as carbon black.

The flame retardant resin composition can be obtained by kneading a base resin, calcium carbonate, a silicone-based compound, a fatty acid-containing compound, and the like. Kneading can be carried out using, for example, a kneading machine such as a Banbury mixer, a tumbler, a pressurized kneader, a kneader extruder, a twin screw extruder, or a mixing roll. At this time, from the viewpoint of enhancing the dispersibility of the silicone-based compound, a master batch (MB) obtained by kneading a portion of the base resin and the silicone-based compound may be kneaded with the remaining base resin, calcium carbonate particles, the fatty acid-containing compound, and the like.

Next, the internal conductor 1 is coated with the flame retardant resin composition. Specifically, the flame retardant resin composition described above is melt kneaded using an extruder, and a tube-shaped extrusion product is formed. Then, this tube-shaped extrusion product is continuously coated on the internal conductor 1. In this manner, an insulated wire 4 is obtained.

(Sheath)

Finally, two insulated wires 4 obtained as described above are prepared, and these insulated wires 4 are coated with a sheath 3 produced using the flame retardant resin composition described above. The sheath 3 protects the insulating layer 2 from physical or chemical damage.

In this manner, a flat cable 10 is obtained.

The present invention is not intended to be limited to the embodiment described above. For example, in the above embodiment, the flat cable 10 has two insulated wires 4; however, the cable of the present invention is not limited to a flat cable, and the cable may have only one insulated wire 4 or may have three or more insulated wires on the inner side of the sheath 3. Furthermore, a resin section formed of polypropylene or the like may also be provided between the sheath 3 and the insulated wire 4. In addition, the cable of the present invention may further have an external conductor between the sheath 3 and the insulated wire 4, as in the case of a coaxial cable.

Furthermore, in the above embodiment, the insulating layer 2 and the sheath 3 of the insulated wire 4 are formed of the flame retardant resin composition, but the insulated wire may also be configured such that the insulating layer 2 is formed of a conventional insulating resin, and only the sheath 3 is formed of the flame retardant resin composition that constitutes the insulating layer 2.

Furthermore, in the above embodiment, the cable has a sheath; however, the cable may not have a sheath. That is, the cable may be composed only of the insulated wire.

Furthermore, in the above embodiment, the flame retardant resin composition of the present invention is used as a material that constitutes an insulating layer of a cable and a sheath, but the flame retardant resin composition of the present invention can also be used in tubes, tapes, packaging materials, construction materials, and the like.

EXAMPLES

Hereinafter, the subject matter of the present invention will be more specifically described by way of Examples and Comparative Examples, but this invention is not intended to be limited to the following Examples.

Examples 1 to 94 and Comparative Examples 1 to 30

A base resin, a silicone master batch (silicone MB), a fatty acid-containing compound, and calcium carbonate particles were incorporated in the amounts of incorporation indicated in Tables 1 to 33, and the components were kneaded for 15 minutes at 160° C. by a Banbury mixer. Thus, a flame retardant resin composition was obtained. Meanwhile, the unit of the amount of incorporation for the various incorporated components as indicated in Tables 1 to 33 is parts by mass. Furthermore, in Tables 1 to 33, the content indicated in the "base resin" column was not 100 parts by mass. However, the silicone MB also included the base resins, and the sum of the amount of incorporation of the "base resin" column and the amount of incorporation of the base resin in the silicone MB was 100 parts by mass.

For the base resin, silicone MB, calcium carbonate particles, fatty acid-containing compound, and n-octadecane as a hydrocarbon, specifically the components described below were used.

(1) Base Resin (1-A) Polyethylene (PE)

EXCELENE GMH GH030 (trade name, manufactured by Sumitomo Chemical Co., Ltd.)

(1-B) Polypropylene (PP)

E-150GK (trade name, manufactured by Prime Polymer Co., Ltd.)

(1-C) EEA

LEXPEARL A115 (trade name, manufactured by Japan Polyethylene Corp.)

(1-D) EMA

LOTRYL 16MA003 (trade name, manufactured by Arkema S.A.)

(1-5) SBR

DYNARON 1320P (trade name, manufactured by JSR Corp.)

(2) Silicone MB (2-A) PE/Silicone Gum

X-22-2125H (trade name, manufactured by Shin-Etsu Chemical Co., Ltd.)

Containing 50% by mass of a silicone gum and 50% by mass of PE (2-B) PP/Silicone Gum X-22-2101 (trade name, manufactured by Shin-Etsu Chemical Co., Ltd.)

Containing 50% by mass of a silicone gum and 50% by mass of PP (3) Calcium Carbonate Particles (3-A) Calcium Carbonate Particles (Average Particle Size 0.08 μm)

HAKUENKA CCR (trade name, manufactured by Shiraishi Calcium Kaisha, Ltd.)

(3-B) Calcium Carbonate Particles (Average Particle Size 0.15 μm)

VIGOT 10 (trade name, manufactured by Shiraishi Calcium Kaisha, Ltd.)

(3-C) Calcium Carbonate Particles (Average Particle Size 0.30 μm)

TUNEX E (trade name, manufactured by Shiraishi Calcium Kaisha, Ltd.)

(3-D) Calcium Carbonate Particles (Average Particle Size 0.70 μm)

SOFTON 3200 (trade name, manufactured by Shiraishi Calcium Kaisha, Ltd.)

(3-E) Calcium Carbonate Particles (Average Particle Size 1.0 μm)

NCC P-2300 (trade name, manufactured by Nitto Funka Kogyo K.K.)

(3-F) Calcium Carbonate Particles (Average Particle Size 1.2 μm)

NCC P-1000 (trade name, manufactured by Nitto Funka Kogyo K.K.)

(3-G) Calcium Carbonate Particles (Average Particle Size 1.5 μm)

SOFTON 1500 (trade name, manufactured by Shiraishi Calcium Kaisha, Ltd.)

(3-H) Calcium Carbonate Particles (Average Particle Size 1.7 μm)

NCC-P (trade name, manufactured by Nitto Funka Kogyo K.K.)

(3-I) Calcium Carbonate Particles (Average Particle Size 1.8 μm)

SOFTON 1200 (trade name, manufactured by Shiraishi Calcium Kaisha, Ltd.)

(3-J) Calcium Carbonate Particles (Average Particle size 2.2 μm)

SOFTON 1000 (trade name, manufactured by Shiraishi Calcium Kaisha, Ltd.)

(3-K) Calcium Carbonate Particles (Average Particle Size 3.6 μm)

BF100 (trade name, manufactured by Shiraishi Calcium Kaisha, Ltd.)

(3-L) Calcium Carbonate Particles (Average Particle Size 5.0 μm)

BF200 (trade name, manufactured by Shiraishi Calcium Kaisha, Ltd.)

(3-M) Calcium Carbonate Particles (Average Particle Size 8.0 μm)

BF300 (trade name, manufactured by Shiraishi Calcium Kaisha, Ltd.)

(3-N) Calcium Carbonate Particles (Average Particle Size 14.8 μm)

NN4200 (trade name, manufactured by Nitto Funka Kogyo K.K.)

(4) Fatty Acid-Containing Compound (4-A) Magnesium Stearate

AFCO CHEM MGS (trade name, manufactured by ADEKA Corp.)

(4-B) Stearic Acid

Stearic acid SAKURA (trade name, manufactured by NOF Corp.)

(4-C) Lauric Acid

NAA-122 (trade name, manufactured by NOF Corp.)

(4-D) Behenic Acid

NAA-222S (trade name, manufactured by NOF Corp.)

(4-E) Montanic Acid

LICOWAX S (trade name, manufactured by Clariant Japan K.K.)

(5) n-Octadecane

OCTADECANE (trade name, manufactured by Junsei Chemical Co., LTd.)

Subsequently, the flame retardant resin composition obtained as described above was kneaded for 15 minutes at 160° C. using a Banbury mixer. Thereafter, this flame retardant resin composition was fed into a single screw extruder (L/D=20, screw type: full flight screw, manufactured by Marth Seiki Co., Ltd.), and a tube-shaped extrusion product was extruded from the extruder and coated on a conductor (number of strands: one/cross-sectional area: 2 $mm^2$) to a thickness of 0.7 mm. Thus, an insulated wire having a coating (insulating layer) on a conductor was obtained.

TABLE 1

| | | | Example 1 | Example 2 | Example 3 | Example 4 |
|---|---|---|---|---|---|---|
| Resin composition | Base resin | PE | 97 | 97 | 97 | 97 |
| | Silicone MB | PE/Silicone gum | 3/3 | 3/3 | 3/3 | 3/3 |
| | Fatty acid-containing compound | Stearic acid | 10 | | | |
| | | Lauric acid | | 10 | | |
| | | Behenic acid | | | 10 | |
| | | Montanic acid | | | | 10 |
| | | Magnesium stearate | | | | |
| | Calcium carbonate particles (average particle size 1.7 μm) | | 40 | 40 | 40 | 40 |
| Mechanical characteristics | | Tensile strength (MPa) | 15.2 | 15.5 | 15.5 | 15 |
| Flame retardancy | 60° inclined combustion test | Fire extinguishing time (seconds) | 32 | 27 | 37 | 36 |

TABLE 2

| | | | Example 5 | Example 6 | Example 7 | Example 8 |
|---|---|---|---|---|---|---|
| Resin composition | Base resin | PE | 98 | 97 | 95 | 90 |
| | Silicone MB | PE/Silicone gum | 2/2 | 3/3 | 5/5 | 10/10 |
| | Fatty acid-containing compound | Stearic acid | | | | |
| | | Lauric acid | | | | |
| | | Behenic acid | | | | |

TABLE 2-continued

|  |  |  | Example 5 | Example 6 | Example 7 | Example 8 |
|---|---|---|---|---|---|---|
|  |  | Montanic acid |  |  |  |  |
|  |  | Magnesium stearate | 10 | 10 | 10 | 10 |
|  | Calcium carbonate particles (average particle size 1.7 μm) |  | 40 | 40 | 40 | 40 |
|  | Mechanical characteristics | Tensile strength (MPa) | 17.2 | 16.4 | 15.8 | 12.3 |
| Flame retardancy | 60° inclined combustion test | Fire extinguishing time (seconds) | 46 | 28 | 22 | 20 |
|  | Vertical combustion test | Grade | B | B | A | A |
|  |  | Fire extinguishing time (seconds) | Burned down | Burned down | 40 | 21 |

TABLE 3

|  |  |  | Example 9 | Example 10 | Example 11 |
|---|---|---|---|---|---|
| Resin composition | Base resin | PE | 97 | 95 | 95 |
|  | Silicone MB | PE/Silicone gum | 3/3 | 5/5 | 5/5 |
|  | Fatty acid-containing compound | Stearic acid |  |  |  |
|  |  | Lauric acid |  |  |  |
|  |  | Behenic acid |  |  |  |
|  |  | Montanic acid |  |  |  |
|  |  | Magnesium stearate | 5 | 5 | 20 |
|  | Calcium carbonate particles (average particle size 1.7 μm) |  | 40 | 40 | 40 |
| Mechanical characteristics |  | Tensile strength (MPa) | 17.1 | 16.5 | 13.2 |
| Flame retardancy | 60° inclined combustion test | Fire extinguishing time (seconds) | 29 | 25 | 26 |
|  | Vertical combustion test | Grade | B | A | A |
|  |  | Fire extinguishing time (seconds) | Burned down | 53 | 46 |

TABLE 4

|  |  |  | Example 12 | Example 13 | Example 14 | Example 15 | Example 16 | Example 17 | Example 18 |
|---|---|---|---|---|---|---|---|---|---|
| Resin composition | Base resin | PE | 97 | 95 | 95 | 95 | 95 | 95 | 95 |
|  | Silicone MB | PE/Silicone gum | 3/3 | 5/5 | 5/5 | 5/5 | 5/5 | 5/5 | 5/5 |
|  | Fatty acid-containing compound | Stearic acid |  |  |  |  |  |  |  |
|  |  | Lauric acid |  |  |  |  |  |  |  |
|  |  | Behenic acid |  |  |  |  |  |  |  |
|  |  | Montanic acid |  |  |  |  |  |  |  |
|  |  | Magnesium stearate | 10 | 10 | 10 | 10 | 10 | 10 | 10 |
|  | Calcium carbonate particles (average particle size 1.7 μm) |  | 10 | 10 | 20 | 30 | 50 | 80 | 120 |
| Mechanical characteristics |  | Tensile strength (MPa) | 19.2 | 18.5 | 17.9 | 17.3 | 15 | 13.8 | 12.1 |
| Flame retardancy | 60° inclined combustion test | Fire extinguishing time (seconds) | 33 | 32 | 30 | 28 | 25 | 28 | 23 |
|  | Vertical combustion test | Grade | B | A | A | A | A | A | A |
|  |  | Fire extinguishing time (seconds) | Burned down | 89 | 72 | 58 | 36 | 25 | 12 |

TABLE 5

|  |  |  | Example 19 | Example 20 | Example 21 | Example 22 | Example 23 | Example 24 | Example 25 | Example 26 | Example 27 |
|---|---|---|---|---|---|---|---|---|---|---|---|
| Resin composition | Base resin | PE | 97 | 97 | 97 | 97 | 97 | 97 | 97 | 97 | 97 |
|  | Silicone MB | PE/Silicone gum | 3/3 | 3/3 | 3/3 | 3/3 | 3/3 | 3/3 | 3/3 | 3/3 | 3/3 |
|  | Fatty acid-containing compound | Magnesium stearate | 10 | 10 | 10 | 10 | 10 | 10 | 10 | 10 | 10 |
|  | Calcium carbonate particles (average particle size 0.70 μm) |  | 40 |  |  |  |  |  |  |  |  |

TABLE 5-continued

|  |  | Example 19 | Example 20 | Example 21 | Example 22 | Example 23 | Example 24 | Example 25 | Example 26 | Example 27 |
|---|---|---|---|---|---|---|---|---|---|---|
|  | Calcium carbonate particles (average particle size 1.0 μm) |  |  | 40 |  |  |  |  |  |  |
|  | Calcium carbonate particles (average particle size 1.2 μm) |  |  |  | 40 |  |  |  |  |  |
|  | Calcium carbonate particles (average particle size 1.5 μm) |  |  |  |  | 40 |  |  |  |  |
|  | Calcium carbonate particles (average particle size 1.8 μm) |  |  |  |  |  | 40 |  |  |  |
|  | Calcium carbonate particles (average particle size 2.2 μm) |  |  |  |  |  |  | 40 |  |  |
|  | Calcium carbonate particles (average particle size 3.6 μm) |  |  |  |  |  |  |  | 40 |  |
|  | Calcium carbonate particles (average particle size 8.0 μm) |  |  |  |  |  |  |  |  | 40 |
|  | Calcium carbonate particles (average particle size 14.8 μm) |  |  |  |  |  |  |  |  | 40 |
| Mechanical characteristics | Tensile strength (MPa) | 16.5 | 17.2 | 16.8 | 16.3 | 16 | 14.6 | 13.8 | 13.6 | 12.3 |
| Flame retardancy | 60° inclined combustion test | Fire extinguishing time (seconds) | 52 | 42 | 35 | 29 | 26 | 21 | 22 | 24 | 23 |

TABLE 6

|  |  |  | Example 28 | Example 29 | Example 30 | Example 31 | Example 32 | Example 33 | Example 34 | Example 35 | Example 36 |
|---|---|---|---|---|---|---|---|---|---|---|---|
| Resin composition | Base resin | PE | 95 | 95 | 95 | 95 | 95 | 95 | 95 | 95 | 95 |
|  | Silicone MB | PE/Silicone gum | 5/5 | 5/5 | 5/5 | 5/5 | 5/5 | 5/5 | 5/5 | 5/5 | 5/5 |
|  | Fatty acid-containing compound | Magnesium stearate | 10 | 10 | 10 | 10 | 10 | 10 | 10 | 10 | 10 |
|  | Calcium carbonate particles (average particle size 0.70 μm) |  | 40 |  |  |  |  |  |  |  |  |
|  | Calcium carbonate particles (average particle size 1.0 μm) |  |  | 40 |  |  |  |  |  |  |  |
|  | Calcium carbonate particles (average particle size 1.2 μm) |  |  |  | 40 |  |  |  |  |  |  |
|  | Calcium carbonate particles (average particle size 1.5 μm) |  |  |  |  | 40 |  |  |  |  |  |
|  | Calcium carbonate particles (average particle size 1.8 μm) |  |  |  |  |  | 40 |  |  |  |  |
|  | Calcium carbonate particles (average particle size 2.2 μm) |  |  |  |  |  |  | 40 |  |  |  |
|  | Calcium carbonate particles (average particle size 3.6 μm) |  |  |  |  |  |  |  | 40 |  |  |
|  | Calcium carbonate particles (average particle size 8.0 μm) |  |  |  |  |  |  |  |  | 40 |  |
|  | Calcium carbonate particles (average particle size 14.8 μm) |  |  |  |  |  |  |  |  |  | 40 |
| Mechanical characteristics | Tensile strength (MPa) |  | 15.5 | 16.2 | 15.5 | 15.3 | 15.3 | 13.8 | 12.3 | 11.7 | 10.7 |
| Flame retardancy | 60° inclined combustion test | Fire extinguishing time (seconds) | 45 | 41 | 38 | 30 | 22 | 20 | 18 | 15 | 15 |
|  | Vertical combustion test | Grade | B | B | A | A | A | A | A | A | A |
|  |  | Fire extinguishing time (seconds) | Burned down | Burned down | 108 | 57 | 40 | 35 | 12 | 3 | 0 |

TABLE 7

|  |  |  | Example 37 | Example 38 | Example 39 | Example 40 | Example 41 | Example 42 | Example 43 | Example 44 |
|---|---|---|---|---|---|---|---|---|---|---|
| Resin composition | Base resin | PE |  |  |  |  |  |  | 67 | 65 |
|  |  | EEA | 97 | 95 |  |  |  |  |  |  |
|  |  | EMA |  |  | 97 | 95 |  |  |  |  |
|  |  | PP |  |  |  |  | 97 | 95 |  |  |
|  |  | SBR |  |  |  |  |  |  | 30 | 30 |
|  | Silicone MB | PE/Silicone gum | 3/3 | 5/5 | 3/3 | 5/5 |  |  | 3/3 | 5/5 |
|  |  | PP/Silicone gum |  |  |  |  | 3/3 | 5/5 |  |  |

TABLE 7-continued

|  |  |  | Example 37 | Example 38 | Example 39 | Example 40 | Example 41 | Example 42 | Example 43 | Example 44 |
|---|---|---|---|---|---|---|---|---|---|---|
|  | Fatty acid-containing compound | Magnesium stearate | 10 | 10 | 10 | 10 | 10 | 10 | 10 | 10 |
|  | Calcium carbonate particles (average particle size 1.7 μm) |  | 40 | 40 | 40 | 40 | 40 | 40 | 40 | 40 |
|  | Mechanical characteristics | Tensile strength (MPa) | 15.5 | 14.9 | 15.5 | 14.9 | 28.7 | 27.5 | 16.0 | 15.2 |
| Flame retardancy | 60° inclined combustion test | Fire extinguishing time (seconds) | 29 | 21 | 30 | 23 | 28 | 22 | 35 | 25 |
|  | Vertical combustion test | Grade | B | A | B | A | B | A | B | A |
|  |  | Fire extinguishing time (seconds) | Burned down | 51 | Burned down | 49 | Burned down | 38 | Burned down | 56 |

TABLE 8

|  |  |  | Example 45 | Example 30 | Example 46 | Example 31 | Example 47 | Example 32 |
|---|---|---|---|---|---|---|---|---|
| Resin composition | Base resin | PE | 95 | 95 | 95 | 95 | 95 | 95 |
|  | Silicone MB | PE/Silicone gum | 5/5 | 5/5 | 5/5 | 5/5 | 5/5 | 5/5 |
|  | Fatty acid-containing compound | Magnesium stearate | 10 | 10 | 10 | 10 | 10 | 10 |
|  | Calcium carbonate particles (average particle size 0.70 μm) |  |  |  |  |  |  |  |
|  | Calcium carbonate particles (average particle size 1.0 μm) |  |  |  |  |  |  |  |
|  | Calcium carbonate particles (average particle size 1.2 μm) |  | 10 | 40 | 120 |  |  |  |
|  | Calcium carbonate particles (average particle size 1.5 μm) |  |  |  |  | 40 |  |  |
|  | Calcium carbonate particles (average particle size 1.8 μm) |  |  |  |  |  | 10 | 40 |
|  | Calcium carbonate particles (average particle size 2.2 μm) |  |  |  |  |  |  |  |
|  | Calcium carbonate particles (average particle size 3.6 μm) |  |  |  |  |  |  |  |
|  | Calcium carbonate particles (average particle size 8.0 μm) |  |  |  |  |  |  |  |
|  | Calcium carbonate particles (average particle size 14.8 μm) |  |  |  |  |  |  |  |
|  | Mechanical characteristics | Tensile strength (MPa) | 17.8 | 15.5 | 12.5 | 15.3 | 17.9 | 15.3 |
|  |  | Surface smoothness | I | I | I | I | I | I |
| Flame retardancy | 60° inclined combustion test | Fire extinguishing time (seconds) | 45 | 38 | 35 | 30 | 29 | 22 |
|  | Vertical combustion test | Grade | A | A | A | A | A | A |
|  |  | Fire extinguishing time (seconds) | 121 | 108 | 82 | 57 | 93 | 40 |

TABLE 9

|  |  |  | Example 48 | Example 33 | Example 49 | Example 34 | Example 50 |
|---|---|---|---|---|---|---|---|
| Resin composition | Base resin | PE | 95 | 95 | 95 | 95 | 95 |
|  | Silicone MB | PE/Silicone gum | 5/5 | 5/5 | 5/5 | 5/5 | 5/5 |
|  | Fatty acid-containing compound | Magnesium stearate | 10 | 10 | 10 | 10 | 10 |
|  | Calcium carbonate particles (average particle size 0.70 μm) |  |  |  |  |  |  |
|  | Calcium carbonate particles (average particle size 1.0 μm) |  |  |  |  |  |  |
|  | Calcium carbonate particles (average particle size 1.2 μm) |  |  |  |  |  |  |
|  | Calcium carbonate particles (average particle size 1.5 μm) |  |  |  |  |  |  |
|  | Calcium carbonate particles (average particle size 1.8 μm) |  | 120 |  |  |  |  |
|  | Calcium carbonate particles (average particle size 2.2 μm) |  |  | 40 |  |  |  |
|  | Calcium carbonate particles (average particle size 3.6 μm) |  |  |  | 10 | 40 | 120 |
|  | Calcium carbonate particles (average particle size 8.0 μm) |  |  |  |  |  |  |
|  | Calcium carbonate particles (average particle size 14.8 μm) |  |  |  |  |  |  |
|  | Mechanical characteristics | Tensile strength (MPa) | 12.2 | 13.8 | 14.6 | 12.3 | 10.4 |
|  |  | Surface smoothness | I | II | II | II | II |
| Flame retardancy | 60° inclined combustion test | Fire extinguishing time (seconds) | 20 | 20 | 21 | 18 | 17 |

TABLE 9-continued

|  |  | Example 48 | Example 33 | Example 49 | Example 34 | Example 50 |
|---|---|---|---|---|---|---|
| Vertical combustion test | Grade | A | A | A | A | A |
|  | Fire extinguishing time (seconds) | 22 | 35 | 33 | 12 | 10 |

TABLE 10

|  |  |  | Example 13 | Example 14 | Example 15 | Example 7 | Example 16 | Example 17 | Example 18 |
|---|---|---|---|---|---|---|---|---|---|
| Resin composition | Base resin | PE | 95 | 95 | 95 | 95 | 95 | 95 | 95 |
|  | Silicone MB | PE/Silicone gum | 5/5 | 5/5 | 5/5 | 5/5 | 5/5 | 5/5 | 5/5 |
|  | Fatty acid-containing compound | Magnesium stearate | 10 | 10 | 10 | 10 | 10 | 10 | 10 |
|  | Calcium carbonate particles (average particle size 1.7 μm) |  | 10 | 20 | 30 | 40 | 50 | 80 | 120 |
| Mechanical characteristics | Tensile strength(MPa) |  | 18.5 | 17.9 | 17.3 | 15.8 | 15 | 13.8 | 12.1 |
|  | Surface smoothness |  | I | I | I | I | I | I | I |
| Flame retardancy | 60° inclined combustion test | Fire extinguishing time (seconds) | 32 | 30 | 28 | 22 | 25 | 28 | 23 |
|  | Vertical combustion test | Grade | A | A | A | A | A | A | A |
|  |  | Fire extinguishing time (seconds) | 89 | 72 | 58 | 40 | 36 | 25 | 12 |

TABLE 11

|  |  |  | Example 8 | Example 10 | Example 11 | Example 6 |
|---|---|---|---|---|---|---|
| Resin composition | Base resin | PE | 90 | 95 | 95 | 97 |
|  | Silicone MB | PE/Silicone gum | 10/10 | 5/5 | 5/5 | 3/3 |
|  | Fatty acid-containing compound | Magnesium stearate | 10 | 5 | 20 | 10 |
|  | Calcium carbonate particles (average particle size 1.7 μm) |  | 40 | 40 | 40 | 40 |
| Mechanical characteristics | Tensile strength(MPa) |  | 12.3 | 16.5 | 13.2 | 16.4 |
|  | Surface smoothness |  | I | I | I | I |
| Flame retardancy | 60° inclined combustion test | Fire extinguishing time (seconds) | 20 | 25 | 26 | 28 |
|  | Vertical combustion test | Grade | A | A | A | B |
|  |  | Fire extinguishing time (seconds) | 21 | 53 | 46 | Burned down |

TABLE 12

|  |  |  | Example 51 | Example 52 | Example 53 |
|---|---|---|---|---|---|
| Resin composition | Base resin | PE | 95 | 95 | 95 |
|  | Silicone MB | PE/Silicone gum | 5/5 | 5/5 | 5/5 |
|  | Fatty acid-containing compound | Stearic acid | 10 |  |  |
|  |  | Behenic acid |  | 10 |  |
|  |  | Montanic acid |  |  | 10 |
|  | Calcium carbonate particles (average particle size 1.7 μm) |  | 40 | 40 | 40 |
| Mechanical characteristics | Tensile strength (MPa) |  | 15.7 | 15.5 | 15.2 |
|  | Surface smoothness |  | 1 | 1 | 1 |
| Flame retardancy | 60° inclined combustion test | Fire extinguishing time (seconds) | 30 | 33 | 33 |
|  | Vertical combustion test | Grade | A | A | A |
|  |  | Fire extinguishing time (seconds) | 42 | 44 | 43 |

TABLE 13

|  |  |  | Example 38 | Example 40 | Example 42 | Example 44 | Example 37 | Example 39 | Example 41 | Example 43 |
|---|---|---|---|---|---|---|---|---|---|---|
| Resin composition | Base resin | PE |  |  |  | 65 |  |  |  | 67 |
|  |  | EEA | 95 |  |  |  | 97 |  |  |  |
|  |  | EMA |  | 95 |  |  |  | 97 |  |  |
|  |  | PP |  |  | 95 |  |  |  | 97 |  |
|  |  | SBR |  |  |  | 30 |  |  |  | 30 |
|  | Silicone MB | PE/Silicone gum | 5/5 | 5/5 |  | 5/5 | 3/3 | 3/3 |  | 3/3 |
|  |  | PP/Silicone gum |  |  | 5/5 |  |  |  | 3/3 |  |
|  | Fatty acid-containing compound | Magnesium stearate | 10 | 10 | 10 | 10 | 10 | 10 | 10 | 10 |
|  | Calcium carbonate particles (average particle size 1.7 μm) |  | 40 | 40 | 40 | 40 | 40 | 40 | 40 | 40 |
| Mechanical characteristics | Tensile strength (MPa) |  | 14.9 | 14.9 | 27.5 | 15.2 | 15.5 | 15.5 | 28.7 | 16 |
|  | Surface smoothness |  | I | I | I | I | I | I | I | I |
| Flame retardancy | 60° inclined combustion test | Fire extinguishing time (seconds) | 21 | 23 | 22 | 25 | 29 | 30 | 28 | 35 |
|  | Vertical combustion test | Grade | A | A | A | A | B | B | B | B |
|  |  | Fire extinguishing time (seconds) | 51 | 49 | 38 | 56 | Burned down | Burned down | Burned down | Burned down |

TABLE 14

|  |  |  | Example 54 | Example 55 | Example 56 | Example 57 |
|---|---|---|---|---|---|---|
| Resin composition | Base resin | PE |  |  |  | 65 |
|  |  | EEA | 95 |  |  |  |
|  |  | EMA |  | 95 |  |  |
|  |  | PP |  |  | 95 |  |
|  |  | SBR |  |  |  | 30 |
|  | Silicone MB | PE/Silicone gum | 5/5 | 5/5 |  | 5/5 |
|  |  | PP/Silicone gum |  |  | 5/5 |  |
|  | Fatty acid-containing compound | Magnesium stearate | 10 | 10 | 10 | 10 |
|  | Calcium carbonate particles (average particle size 8 μm) |  | 40 | 40 | 40 | 40 |
| Mechanical characteristics | Tensile strength (MPa) |  | 11.2 | 11 | 22.7 | 10.8 |
|  | Surface smoothness |  | IV | IV | IV | IV |
| Flame retardancy | 60° inclined combustion test | Fire extinguishing time (seconds) | 20 | 21 | 20 | 23 |
|  | Vertical combustion test | Grade | A | A | A | A |
|  |  | Fire extinguishing time (seconds) | 45 | 42 | 36 | 51 |

TABLE 15

|  |  |  | Example 28 | Example 29 | Example 35 | Example 36 |
|---|---|---|---|---|---|---|
| Resin composition | Base resin | PE | 95 | 95 | 95 | 95 |
|  | Silicone MB | PE/Silicone gum | 5/5 | 5/5 | 5/5 | 5/5 |
|  | Fatty acid-containing compound | Magnesium stearate | 10 | 10 | 10 | 10 |
|  | Calcium carbonate particles (average particle size 0.70 μm) |  | 40 |  |  |  |
|  | Calcium carbonate particles (average particle size 1.0 μm) |  |  |  | 40 |  |
|  | Calcium carbonate particles (average particle size 1.2 μm) |  |  |  |  |  |
|  | Calcium carbonate particles (average particle size 1.5 μm) |  |  |  |  |  |
|  | Calcium carbonate particles (average particle size 1.8 μm) |  |  |  |  |  |
|  | Calcium carbonate particles (average particle size 2.2 μm) |  |  |  |  |  |
|  | Calcium carbonate particles (average particle size 3.6 μm) |  |  |  |  |  |
|  | Calcium carbonate particles (average particle size 8.0 μm) |  |  |  |  | 40 |
|  | Calcium carbonate particles (average particle size 14.8 μm) |  |  | 40 |  |  |
| Mechanical characteristics | Tensile strength (MPa) |  | 15.5 | 16.2 | 11.7 | 10.7 |
|  | Surface smoothness |  | I | I | IV | IV |
| Flame retardancy | 60° inclined combustion test | Fire extinguishing time (seconds) | 45 | 41 | 15 | 15 |
|  | Vertical combustion test | Grade | B | B | A | A |
|  |  | Fire extinguishing time (seconds) | Burned down | Burned down | 3 | 0 |

TABLE 16

|  |  |  | Example 58 | Example 19 | Example 59 | Example 12 | Example 20 | Example 60 |
|---|---|---|---|---|---|---|---|---|
| Resin composition | Base resin | PE | 97 | 97 | 97 | 97 | 97 | 97 |
|  | Silicone MB | PE/Silicone gum | 3/3 | 3/3 | 3/3 | 3/3 | 3/3 | 3/3 |
|  | Fatty acid-containing compound | Magnesium stearate | 10 | 10 | 10 | 10 | 10 | 10 |
|  | Calcium carbonate particles (average particle size 0.30 μm) |  |  |  |  |  |  |  |
|  | Calcium carbonate particles (average particle size 0.70 μm) |  | 10 | 40 | 120 |  |  |  |
|  | Calcium carbonate particles (average particle size 1.0 μm) |  |  |  |  | 10 | 40 | 120 |
|  | Calcium carbonate particles (average particle size 1.2 μm) |  |  |  |  |  |  |  |
| Mechanical characteristics |  | Tensile strength (MPa) | 18.9 | 16.5 | 14.1 | 18.7 | 17.2 | 13.6 |
| Low temperature resistance |  | Crack generation temperature (° C.) | <−60 | <−60 | <−60 | −60 | −60 | −55 |
|  |  | Evaluation | A | A | A | A | A | A |
| Flame retardancy | 60° inclined combustion test | Fire extinguishing time (seconds) | 58 | 52 | 47 | 48 | 42 | 39 |

TABLE 17

|  |  |  | Example 61 | Example 62 | Example 63 |
|---|---|---|---|---|---|
| Resin composition | Base resin | PE | 97 | 97 | 97 |
|  | Silicone MB | PE/Silicone gum | 3/3 | 3/3 | 3/3 |
|  | Fatty acid-containing compound | Magnesium stearate | 10 | 10 | 10 |
|  | Calcium carbonate particles (average particle size 0.30 μm) |  |  |  |  |
|  | Calcium carbonate particles (average particle size 0.70 μm) |  |  |  |  |
|  | Calcium carbonate particles (average particle size 1.0 μm) |  |  |  |  |
|  | Calcium carbonate particles (average particle size 1.2 μm) |  | 10 | 40 | 120 |
| Mechanical characteristics |  | Tensile strength (MPa) | 18.3 | 16.8 | 13.2 |
| Low temperature resistance |  | Crack generation temperature (° C.) | −50 | −50 | −50 |
|  |  | Evaluation | B | B | B |
| Flame retardancy | 60° inclined combustion test | Fire extinguishing time (seconds) | 44 | 38 | 33 |

TABLE 18

|  |  |  | Example 64 | Example 65 | Example 66 | Example 67 |
|---|---|---|---|---|---|---|
| Resin composition | Base resin | PE | 97 | 97 | 97 | 97 |
|  | Silicone MB | PE/Silicone gum | 3/3 | 3/3 | 3/3 | 3/3 |
|  | Fatty acid-containing compound | Magnesium stearate | 10 | 10 | 10 | 10 |
|  | Calcium carbonate particles (average particle size 1.0 μm) |  | 20 | 30 | 50 | 80 |
| Mechanical characteristics |  | Tensile strength (MPa) | 17.9 | 17.3 | 16.7 | 14.2 |
| Low temperature resistance |  | Crack generation temperature (° C.) | <−60 | <−60 | −60 | −60 |
|  |  | Evaluation | A | A | A | A |
| Flame retardancy | 60° inclined combustion test | Fire extinguishing time (seconds) | 47 | 45 | 41 | 40 |

TABLE 19

|  |  |  | Example 68 | Example 29 | Example 69 | Example 70 | Example 71 |
|---|---|---|---|---|---|---|---|
| Resin composition | Base resin | PE | 98 | 95 | 90 | 97 | 97 |
|  | Silicone MB | PE/Silicone gum | 2/2 | 5/5 | 10/10 | 3/3 | 3/3 |
|  | Fatty acid-containing compound | Magnesium stearate | 10 | 10 | 10 | 5 | 20 |
|  | Calcium carbonate particles (average particle size 1.0 μm) |  | 40 | 40 | 40 | 40 | 40 |
| Mechanical characteristics |  | Tensile strength (MPa) | 16.4 | 16.2 | 12.3 | 16.5 | 13.2 |
| Low temperature resistance |  | Crack generation temperature (° C.) | −60 | −60 | −60 | −60 | −60 |
|  |  | Evaluation | A | A | A | A | A |
| Flame retardancy | 60° inclined combustion test | Fire extinguishing time (seconds) | 50 | 39 | 30 | 43 | 40 |

TABLE 20

|  |  |  | Example 72 | Example 73 | Example 74 |
|---|---|---|---|---|---|
| Resin composition | Base resin | PE | 97 | 97 | 97 |
|  | Silicone MB | PE/Silicone gum | 3/3 | 3/3 | 3/3 |
|  | Fatty acid-containing compound | Stearic acid | 10 |  |  |
|  |  | Behenic acid |  | 10 |  |
|  |  | Montanic acid |  |  | 10 |
|  | Calcium carbonate particles (average particle size 1.0 μm) |  | 40 | 40 | 40 |
| Mechanical characteristics | Tensile strength (MPa) |  | 17 | 16.8 | 17.3 |
| Low temperature resistance | Crack generation temperature (° C.) |  | −60 | −60 | −60 |
|  | Evaluation |  | A | A | A |
| Flame retardancy | 60° inclined combustion test | Fire extinguishing time (seconds) | 42 | 47 | 46 |

TABLE 21

|  |  |  | Example 75 | Example 76 | Example 77 |
|---|---|---|---|---|---|
| Resin composition | Base resin | PE |  |  | 65 |
|  |  | EEA | 95 |  |  |
|  |  | EMA |  | 95 |  |
|  |  | SBR |  |  | 30 |
|  | Silicone MB | PE/Silicone gum | 5/5 | 5/5 | 5/5 |
|  | Fatty acid-containing compound | Magnesium stearate | 10 | 10 | 10 |
|  | Calcium carbonate particles (average particle size 1.0 μm) |  | 40 | 40 | 40 |
| Mechanical characteristics | Tensile strength (MPa) |  | 15.1 | 15.2 | 15.5 |
| Low temperature resistance | Crack generation temperature (° C.) |  | −55 | −60 | −60 |
|  | Evaluation |  | A | A | A |
| Flame retardancy | 60° inclined combustion test | Fire extinguishing time (seconds) | 33 | 35 | 40 |

TABLE 22

|  |  |  | Example 78 | Example 79 | Example 80 |
|---|---|---|---|---|---|
| Resin composition |  | PE |  |  | 65 |
|  |  | EEA | 95 |  |  |
|  |  | EMA |  | 95 |  |
|  |  | SBR |  |  | 30 |
|  | Silicone MB (PE/Silicone gum) |  | 5/5 | 5/5 | 5/5 |
|  | Fatty acid-containing compound | Magnesium stearate | 10 | 10 | 10 |
|  | Calcium carbonate particles (average particle size 1.2 μm) |  | 40 | 40 | 40 |
| Mechanical characteristics | Tensile strength (MPa) |  | 14.7 | 14.5 | 15 |
| Low temperature resistance | Crack generation temperature (° C.) |  | −50 | −50 | −50 |
|  | Evaluation |  | B | B | B |
| Flame retardancy | 60° inclined combustion test | Fire extinguishing time (seconds) | 33 | 32 | 36 |

TABLE 23

|  |  |  | Example 24 | Example 25 | Example 81 |
|---|---|---|---|---|---|
| Resin composition | Base resin | PE | 97 | 97 | 97 |
|  | Silicone MB | PE/Silicone gum | 3/3 | 3/3 | 3/3 |
|  | Fatty acid-containing compound | Magnesium stearate | 10 | 10 | 10 |
|  | Calcium carbonate particles (average particle size 1.8 μm) |  |  |  |  |
|  | Calcium carbonate particles (average particle size 2.2 μm) |  | 40 |  |  |
|  | Calcium carbonate particles (average particle size 3.6 μm) |  |  | 40 |  |
|  | Calcium carbonate particles (average particle size 5.0 μm) |  |  |  | 40 |
|  | Calcium carbonate particles (average particle size 8.0 μm) |  |  |  |  |
| Mechanical characteristics | Tensile strength (MPa) |  | 14.6 | 13.8 | 13.2 |
|  | Terminal workability |  | A | A | A |
| Flame retardancy | 60° inclined combustion test | Fire extinguishing time (seconds) | 21 | 22 | 21 |

TABLE 24

|  |  |  | Example 82 | Example 83 | Example 84 | Example 85 | Example 86 | Example 87 |
|---|---|---|---|---|---|---|---|---|
| Resin composition | Base resin | PE | 97 | 97 | 97 | 97 | 97 | 97 |
|  | Silicone MB | PE/Silicone gum | 3/3 | 3/3 | 3/3 | 3/3 | 3/3 | 3/3 |
|  | Fatty acid-containing compound | Magnesium stearate | 10 | 10 | 10 | 10 | 10 | 10 |
|  | Calcium carbonate particles (average particle size 2.2 μm) |  | 10 | 20 | 30 | 50 | 80 | 120 |
| Mechanical characteristics | Tensile strength (MPa) |  | 16.3 | 16 | 15.1 | 13.8 | 12.7 | 11.5 |
|  | Terminal workability |  | B | A | A | A | A | A |
| Flame retardancy | 60° inclined combustion test | Fire extinguishing time (seconds) | 28 | 25 | 24 | 21 | 22 | 20 |

TABLE 25

|  |  |  | Example 88 | Example 89 | Example 90 | Example 91 |
|---|---|---|---|---|---|---|
| Resin composition | Base resin | PE | 97 | 97 | 97 | 97 |
|  | Silicone MB | PE/Silicone gum | 3/3 | 3/3 | 3/3 | 3/3 |
|  | Fatty acid-containing compound | Stearic acid | 10 |  |  |  |
|  |  | Lauric acid |  | 10 |  |  |
|  |  | Behenic acid |  |  | 10 |  |
|  |  | Montanic acid |  |  |  | 10 |
|  | Calcium carbonate particles (average particle size 2.2 μm) |  | 40 | 40 | 40 | 40 |
| Mechanical characteristics | Tensile strength (MPa) |  | 14.3 | 14.1 | 14.1 | 14.7 |
|  | Terminal workability |  | A | A | A | A |
| Flame retardancy | 60° inclined combustion test | Fire extinguishing time (seconds) | 28 | 23 | 27 | 27 |

TABLE 26

|  |  |  | Example 92 | Example 93 | Example 94 |
|---|---|---|---|---|---|
| Resin composition | Base resin | PE | 97 | 97 | 98.5 |
|  | Silicone MB | PE/Silicone gum | 3/3 | 3/3 | 1.5/1.5 |
|  | Fatty acid-containing compound | Magnesium stearate | 5 | 20 | 10 |
|  | Calcium carbonate particles (average particle size 2.2 μm) |  | 40 | 40 | 40 |
| Mechanical characteristics | Tensile strength (MPa) |  | 15.1 | 13.1 | 15.3 |
|  | Terminal workability |  | A | B | A |
| Flame retardancy | 60° inclined combustion test | Fire extinguishing time (seconds) | 27 | 22 | 38 |

TABLE 27

|  |  |  | Comparative Example 1 | Comparative Example 2 | Comparative Example 3 | Comparative Example 4 | Comparative Example 5 | Comparative Example 6 |
|---|---|---|---|---|---|---|---|---|
| Resin composition | Base resin | PE | 97 | 100 | 100 | 97 | 97 | 100 |
|  | Silicone MB | PE/Silicone gum | 3/3 |  |  | 3/3 | 3/3 |  |
|  | Fatty acid-containing compound | Magnesium stearate |  | 10 |  |  | 10 | 10 |
|  | Calcium carbonate particles (Average particle size 1.7 μm) |  |  |  | 40 |  | 40 | 40 |
| Mechanical characteristics | Tensile strength (MPa) |  | 19.8 | 20.2 | 16.6 | 18.8 | 16.1 | 16.2 |
| Flame retardancy | 60° inclined combustion test | Fire extinguishing time (seconds) | Burned down | Burned down | Burned down | Burned down | Burned down | Burned down |

TABLE 28

|  |  |  | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|---|
| Resin composition | Base resin | PE | 99 | 97 | 97 | 97 | 97 | 97 | 97 |
|  | Silicone MB | PE/Silicone gum | 1/1 | 3/3 | 3/3 | 3/3 | 3/3 | 3/3 | 3/3 |
|  | Fatty acid-containing compound | Magnesium stearate | 10 | 3 | 10 | 10 | 10 | 10 | 10 |
|  | Hydrocarbon | n-octadecane |  |  |  |  |  |  | 10 |

TABLE 28-continued

|  |  | Comparative Example 7 | Comparative Example 8 | Comparative Example 9 | Comparative Example 10 | Comparative Example 11 | Comparative Example 12 | Comparative Example 13 |
|---|---|---|---|---|---|---|---|---|
|  | Calcium carbonate particles (Average particle size 1.7 μm) | 40 | 40 | 5 |  |  |  | 40 |
|  | Calcium carbonate particles (Average particle size 0.08 μm) |  |  |  | 40 |  |  |  |
|  | Calcium carbonate particles (Average particle size 0.15 μm) |  |  |  |  | 40 |  |  |
|  | Calcium carbonate particles (Average particle size 0.30 μm) |  |  |  |  |  | 40 |  |
| Mechanical characteristics | Tensile strength (MPa) | 17.2 | 16.8 | 19.5 | 15.7 | 15.8 | 15 | 15 |
| Flame retardancy | 60° inclined combustion test Fire extinguishing time (seconds) | Burned down | 87.8 | Burned down | 82 | 80 | 68 | Burned down |

TABLE 29

|  |  |  | Comparative Example 14 | Comparative Example 15 | Comparative Example 16 | Comparative Example 17 |
|---|---|---|---|---|---|---|
| Resin composition | Base resin | PE |  |  |  | 67 |
|  |  | EEA | 97 |  |  |  |
|  |  | EMA |  | 97 |  |  |
|  |  | PP |  |  | 97 |  |
|  |  | SBR |  |  |  | 30 |
|  | Silicone MB | PE/Silicone gum | 3/3 | 3/3 |  | 3/3 |
|  |  | PP/Silicone gum |  |  | 3/3 |  |
|  | Fatty acid-containing compound | Magnesium stearate | 10 | 10 | 10 | 10 |
|  | Calcium carbonate particles (Average particle size 0.30 μm) |  | 40 | 40 | 40 | 40 |
| Mechanical characteristics | Tensile strength (MPa) |  | 14.9 | 15.2 | 26.5 | 15.2 |
| Flame retardancy | 60° inclined combustion test | Fire extinguishing time (seconds) | 75 | 72 | 74 | 96 |

TABLE 30

|  |  |  | Comparative Example 18 | Comparative Example 19 | Comparative Example 20 | Comparative Example 21 |
|---|---|---|---|---|---|---|
| Resin composition | Base resin | PE | 95 | 95 | 95 | 95 |
|  | Silicone MB | PE/Silicone gum | 5/5 | 5/5 | 5/5 | 5/5 |
|  | Fatty acid-containing compound | Magnesium stearate | 10 | 3 |  | 10 |
|  | Calcium carbonate particles (Average particle size 1.7 μm) |  | 5 | 40 | 40 |  |
| Mechanical characteristics | Tensile strength (MPa) |  | 19.1 | 16.7 | 16.3 | 18.7 |
|  | Surface smoothness |  | I | I | I | I |
| Flame retardancy | 60° inclined combustion test | Fire extinguishing time (seconds) | Burned down | 85.1 | Burned down | Burned down |
|  | Vertical combustion test | Grade | B | B | B | B |
|  |  | Fire extinguishing time (seconds) | Burned down | Burned down | Burned down | Burned down |

TABLE 31

|  |  |  | Comparative Example 22 | Comparative Example 23 |
|---|---|---|---|---|
| Resin composition | PE |  | 95 | 95 |
|  | Silicone MB (PE/Silicone gum) |  | 5/5 | 5/5 |
|  | Fatty acid-containing compound | Magnesium stearate |  |  |
|  | Hydrocarbon | n-octadecane |  | 10 |
|  | Calcium carbonate particles (Average particle size 1.7 μm) |  |  | 40 |
| Mechanical characteristics | Tensile strength (MPa) |  | 19.3 | 14.9 |
|  | Surface smoothness |  | I | I |
| Flame retardancy | 60° inclined combustion test | Fire extinguishing time (seconds) | Burned down | Burned down |
|  | Vertical combustion test | Grade | B | B |
|  |  | Fire extinguishing time (seconds) | Burned down | Burned down |

TABLE 32

|  |  |  | Comparative Example 24 | Comparative Example 25 | Comparative Example 26 |
|---|---|---|---|---|---|
| Resin composition | Base resin | PE | 97 | 99 | 97 |
|  | Silicone MB | PE/Silicone gum | 3/3 | 1/1 | 3/3 |
|  | Fatty acid-containing compound | Magnesium stearate | 10 | 10 | 3 |
|  | Calcium carbonate particles (Average particle size 0.30 μm) |  |  |  |  |
|  | Calcium carbonate particles (Average particle size 0.70 μm) |  |  |  |  |
|  | Calcium carbonate particles (Average particle size 1.0 μm) |  | 5 | 40 | 40 |
|  | Calcium carbonate particles (Average particle size 1.2 μm) |  |  |  |  |
|  | Mechanical characteristics | Tensile strength (MPa) | 19.8 | 17.5 | 17.1 |
| Flame retardancy | 60° inclined combustion test | Fire extinguishing time (seconds) | Burned down | Burned down | 90 |

TABLE 33

|  |  |  | Comparative Example 27 | Comparative Example 28 | Comparative Example 29 | Comparative Example 30 |
|---|---|---|---|---|---|---|
| Resin composition | Base resin | PE | 97 | 100 | 100 | 97 |
|  | Silicone MB | PE/Silicone gum | 3/3 |  |  | 3/3 |
|  | Fatty acid-containing compound | Magnesium stearate |  |  | 10 |  |
|  | Hydrocarbon | n-octadecane |  |  |  | 10 |
|  | Calcium carbonate particles (Average particle size 1.0 μm) |  | 40 | 40 | 40 | 40 |
|  | Mechanical characteristics | Tensile strength (MPa) | 17 | 16.8 | 16.6 | 15.2 |
| Flame retardancy | 60° inclined combustion test | Fire extinguishing time (seconds) | Burned down | Burned down | Burned down | Burned down |

For the insulated wires of Examples 1 to 94 and Comparative Examples 1 to 30 obtained as described above, evaluations of the mechanical characteristics, flame retardancy, surface smoothness, low temperature resistance, and terminal workability were carried out as follows.

<Mechanical Characteristics>

The evaluation of the mechanical characteristics was carried out by performing a tensile test according to JIS C3005 for the insulated wires of Examples 1 to 94 and Comparative Examples 1 to 30, and performing an evaluation based on the tensile strength thus measured. The results are presented in Tables 1 to 33. The unit of tensile strength in Tables 1 to 33 is MPa, and the criteria for acceptance or unacceptance of the tensile strength are as follows. Meanwhile, in the tensile test, the tensile rate was 200 mm/min, and the gauge length was 20 mm.

10 MPa or greater: Accepted
Less than 10 MPa: Unaccepted

<Flame Retardancy>

(60-Degree Inclined Combustion Test)

For the insulated wires of Examples 1 to 94 and Comparative Examples 1 to 30, the 60° inclined combustion test of JIS C3005 was carried out, and flame retardancy was evaluated. The results are presented in Tables 1 to 33. In Tables 1 to 33, a flame retardancy test was carried out by preparing ten insulated wires for each of the Examples and Comparative Examples, and the average value of the fire extinguishing time (unit: seconds) of the ten insulated wires was measured. Here, the fire extinguishing time is the time taken from immediately after the completion of flame contact (immediately after the flame of a burner was separated from the wire) to self-extinction, and a shorter fire extinguishing time implies superior flame retardancy. At this time, contacting of flame was performed such that ignition would occur in the wire within 30 seconds. The results are presented in Tables 1 to 33. Meanwhile, the unit of the average value of the fire extinguishing time in Tables 1 to 33 is seconds. The criteria for acceptance or unacceptance of the average value of the fire extinguishing time are as follows, and in Tables 27 and 28, Comparative Examples that did not undergo self-extinction are indicated as "Burned down".

60 seconds or less: Accepted
More than 60 seconds: Unaccepted (Vertical Combustion Test)

For the insulated wires of Examples 5 to 18, Examples 28 to 57 and Comparative Examples 18 to 23, a vertical combustion test was performed according to JIB C3665, and flame retardancy was evaluated. The results are presented in Tables 2 to 4, Tables 6 to 15, and Tables 30 and 31. At this time, specifically, when the distance from the lower end of a top supporting material that supported the insulated wire at the top, to the end point of carbonization was from 50 mm to 540 mm, the sample was indicated as grade "A"; and when the distance was less than 50 mm or more than 540 mm, the sample was indicated as grade "B". Furthermore, for the Examples indicated with grade "A", the fire extinguishing time (unit: seconds) is also indicated for the item "Vertical combustion test" in Tables 2 to 4, Tables 6 to 15, and Tables 30 and 31 for reference. Here, the fire extinguishing time is the time taken from immediately after the completion of flame contact (immediately after the flame of a burner was separated from the wire) to self-extinction, and a shorter fire extinguishing time implies superior flame retardancy. At this time, contacting of flame was performed such that ignition would occur in the wire within 30 seconds. For example, a fire extinguishing time of 0 seconds means a state in which after flame contact for 60 seconds, there would be no remaining flame immediately after the burner was separated. Furthermore, for the Examples indicated with grade "B", self-extinction did not occur, and in Tables 2 to 4, Tables 6 to 15, and Tables 30 and 31, "Burned down" is described underneath "B" for the item "Flame retardancy (Vertical combustion test)". In addition, for Examples 1 to 4, Examples 19 to 27, and Examples 58 to 94, the vertical combustion test was not performed. Also, for all of the insulated wires of Comparative Examples 17 and 24 to 30, flame retardancy was considered unacceptable in the 60° inclined combustion test, and therefore, the vertical combustion test was not performed.

<Surface Smoothness>

Surface smoothness was evaluated for the insulated wires of Examples 6 to 8, 10 to 11, 13 to 18, 28 to 36, and 45 to 57, and Comparative Examples 18 to 23, according to the following criteria I to IV. The results are presented in Tables 8 to 15 and Tables 30 and 31.

I: Surface asperities are not recognized even when touched, and the surface appears glossy.

II: Surface asperities are not recognized even when touched, and the surface does not appear glossy.

III: Surface asperities can be recognized when touched, but surface asperities cannot be recognized with naked eyes.

IV: Surface asperities can be recognized when touched, and surface asperities can be recognized even with naked eyes.

<Low Temperature Resistance>

Low temperature resistance was evaluated for the flame retardant resin compositions of Examples 12, 19, 20 and 29, and Examples 58 to 80, by performing a low temperature embrittlement test according to JIS K7216. Specifically, sheet-like test specimens having a thickness of 2 mm were produced using the flame retardant resin compositions of Examples 12, 19, 20 and 29, and Examples 58 to 80. Each of the specimens was placed in a testing chamber maintained at a test temperature of 0° C. to −60° C. and fixed to the front end of a cantilever, a predetermined impact (test velocity 2 m/s) was applied to the specimens, and the state of destruction of the specimens was observed. The test was carried out from 0° C. to −60° C. at a step of 5° C., and the low temperature resistance was evaluated with the temperature at which cracks were generated in the specimen by the impact (crack generation temperature). The results are presented in Tables 16 to 22. Low temperature resistance was evaluated according to the following criteria.

A: The crack generation temperature was lower than −50° C.

B: The crack generation temperature was higher than or equal to −50° C.

Furthermore, a sample in which cracks were not generated by an impact at −60° C., the crack generation temperature was considered to be lower than −60° C., and "<−60" is indicated in the column for the crack generation temperature in the tables.

<Terminal Workability>

Regarding the evaluation of terminal workability, workability at the time of gripping the coatings of the terminals of the insulated wires of Examples 24, 25 and Examples 81 to 94 and stripping the coatings using a stripper, was evaluated according to the following criteria. The results are presented in Tables 23 to 26.

A: Stripping processing can be carried out without causing elongation of the coating and scratching of the conductor.

B: Elongation of the coating slightly occurred, but stripping processing can be carried out without causing scratching in the conductor or in the coating of the gripped part.

C: Elongation of the coating or scratching in the conductor or in the coating of the gripped part occurred, and stripping process cannot be carried out.

From the results exhibited in Tables 1 to 33, the insulated wires of Examples 1 to 94 passed the acceptance criteria in the mechanical characteristics test and the 60° inclined combustion test. On the contrary, the insulated wires of Comparative Examples 1 to 30 did not pass the acceptance criteria of the 60° inclined combustion test.

From this point of view, it was confirmed that according to the flame retardant resin composition of the present invention is used, excellent flame retardancy can be secured while securing excellent mechanical characteristics.

EXPLANATIONS OF REFERENCE NUMERALS

1 INTERNAL CONDUCTOR
2 INSULATING LAYER
3 SHEATH
4 INSULATED WIRE
10 FLAT CABLE

The invention claimed is:

1. A flame retardant resin composition comprising:
a base resin;
calcium carbonate particles that are incorporated at a proportion of from 10 parts by mass to 80 parts by mass relative to 100 parts by mass of the base resin;
a silicone-based compound that is incorporated at a proportion of 1.5 parts by mass or more and 10 parts by mass or less relative to 100 parts by mass of the base resin; and
a fatty acid-containing compound that is incorporated at a proportion of more than 3 parts by mass and 20 parts by mass or less relative to 100 parts by mass of the base resin, wherein,
the average particle size of the calcium carbonate particles is from 0.7 μm to 15 μm,
the silicone-based compound includes polyorganosiloxanes, and,
the fatty acid-containing compound is a compound containing a fatty acid or a metal salt of a fatty acid, the fatty acid having 12 to 28 carbon atoms.

2. The flame retardant resin composition according to claim 1, wherein the average particle size of the calcium carbonate particles is 1.2 μm or larger and 15 μm or less.

3. The flame retardant resin composition according to claim 2, wherein the average particle size of the calcium carbonate particles is from 1.2 μm to 3.6 μm.

4. The flame retardant resin composition according to claim 3, wherein the average particle size of the calcium carbonate particles is from 1.2 μm to 1.8 μm.

5. The flame retardant resin composition according to claim 3, wherein the average particle size of the calcium carbonate particles is larger than 1.8 μm and less than or equal to 3.6 μm.

6. The flame retardant resin composition according to claim 1, wherein the silicone-based compound is incorporated at a proportion of more than 3 parts by mass and less than or equal to 10 parts by mass relative to 100 parts by mass of the base resin.

7. The flame retardant resin composition according to claim 1, wherein
the average particle size of the calcium carbonate particles is larger than 1.8 μm and less than or equal to 5.0 μm, and
the silicone-based compound is incorporated at a proportion of 1.5 parts by mass or more and less than or equal to 3 parts by mass relative to 100 parts by mass of the base resin.

8. The flame retardant resin composition according to claim 1, wherein
the average particle size of the calcium carbonate particles is more than or equal to 0.7 μm and less than 1.2 μm, and
the silicone-based compound is incorporated at a proportion of 1.5 parts by mass or more and less than or equal to 3 parts by mass relative to 100 parts by mass of the base resin.

9. The flame retardant resin composition according to claim 1, wherein the ratio of the amount of incorporation of the fatty acid-containing compound with respect to the amount of incorporation of the silicone-based compound is larger than 2 and less than or equal to 5.

10. The flame retardant resin composition according to claim 1, wherein the base resin is a polyolefin compound.

11. A cable comprising:
an insulated wire having a conductor and an insulating layer coating the conductor,
the insulating layer being formed of the flame retardant resin composition according to claim 1.

12. A cable comprising:
an insulated wire having a conductor and an insulating layer coating the conductor; and
a sheath that covers the insulating layer,
at least one of the insulating layer and the sheath being formed of the flame retardant resin composition according to claim 1.

13. A flame retardant resin composition comprising:
a base resin;
calcium carbonate particles that are incorporated at a proportion of from 10 parts by mass to 120 parts by mass relative to 100 parts by mass of the base resin;
a silicone-based compound that is incorporated at a proportion of 1.5 parts by mass or more and 10 parts by mass or less relative to 100 parts by mass of the base resin; and
a fatty acid-containing compound that is incorporated at a proportion of more than 3 parts by mass and 20 parts by mass or less relative to 100 parts by mass of the base resin, wherein
the average particle size of the calcium carbonate particles is from 0.7 μm to 15 μm,
the fatty acid-containing compound is incorporated at a proportion of 8.33 parts by mass or more and 100 parts by mass or less relative to 100 parts by mass of calcium carbonate particles,
the silicone-based compound includes polyorganosiloxanes, and,
the fatty acid-containing compound is a compound containing a fatty acid or a metal salt of a fatty acid, the fatty acid having 12 to 28 carbon atoms.

14. The flame retardant resin composition according to claim 13, wherein the average particle size of the calcium carbonate particles is from 1.2 μm to 3.6 μm.

\* \* \* \* \*